United States Patent [19]

Nelson

[11] Patent Number: 5,023,143
[45] Date of Patent: * Jun. 11, 1991

[54] LOW SHRINK FORCE SHRINK FILM

[75] Inventor: Martindale Nelson, Greer, S.C.

[73] Assignee: W. R. Grace & Co. - Conn., Duncan, S.C.

[*] Notice: The portion of the term of this patent subsequent to May 23, 2006 has been disclaimed.

[21] Appl. No.: 323,535

[22] Filed: Mar. 14, 1989

[51] Int. Cl.$^5$ ............................................. B32B 27/08
[52] U.S. Cl. ................................. 428/516; 428/483; 428/520
[58] Field of Search ................ 428/516, 349, 518, 520

[56] References Cited

U.S. PATENT DOCUMENTS

| | | | |
|---|---|---|---|
| 3,595,735 | 7/1971 | Tyrell | 161/162 |
| 4,188,443 | 2/1980 | Mueller et al. | 428/216 |
| 4,194,039 | 3/1980 | Mueller | 428/213 |
| 4,352,849 | 10/1982 | Mueller | 428/520 |
| 4,399,173 | 8/1983 | Anthony et al. | 428/35 |
| 4,399,180 | 8/1983 | Briggs et al. | 428/212 |
| 4,514,465 | 4/1985 | Schoenberg | 428/515 |
| 4,532,189 | 7/1985 | Mueller | 428/516 |
| 4,551,380 | 11/1985 | Schoenberg | 428/218 |
| 4,590,124 | 5/1986 | Schoenberg | 428/520 |
| 4,833,024 | 5/1989 | Mueller | 428/516 |

FOREIGN PATENT DOCUMENTS 0229715 7/1987 European Pat. Off. .

Primary Examiner—Edith Buffalow
Attorney, Agent, or Firm—John J. Toney; William D. Lee, Jr.; Mark B. Quatt

[57] ABSTRACT

The multilayer shrink film of the present invention provides very low shrink tension approximating some PVC films, while providing relatively high free shrink characteristics and relatively low shrink temperatures. The preferred film has three layers including a relatively thick core layer comprising a polymeric material or blend of polymeric materials having a relatively low melting point, typically less than about 100° C., two outer layers comprising a polymeric material or blend of polymeric materials having a relatively high melting point, typically greater than about 100° C., the material of the outer layers having a melting point at least about 10° C. higher than the melting point of the material of the core layer.

18 Claims, 1 Drawing Sheet

LOW SHRINK FORCE SHRINK FILM

FIELD OF THE INVENTION

This invention relates to heat shrinkable, packaging films; and in particular, this invention relates to a multilayer, polyolefin shrink film characterized by relatively low shrink tensions and relatively high free shrink.

BACKGROUND OF THE INVENTION

The polyolefins and polyvinyl chlorides can be considered to be the two major families of plastic resins from which the bulk of commercially available shrink films for wrapping purposes are made. Other resin families from which shrink films can be made include the ionomers, polyesters, polystyrenes, and polyvinylidene chlorides. The shrinkable polyolefins currently on the market are mainly monolayer films which include both cross-linked and uncross-linked oriented polyethylene, oriented polypropylene, and oriented ethylene-propylene copolymers. The polyvinyl chloride (hereinafter "PVC") shrink films are monolayer films consisting of a variety of formulations of polyvinyl chloride.

A shrink film's distinguishing characteristic is its ability upon exposure to some level of heat to shrink or, if restrained, to create shrink tension within the film. This ability is activated by the packager when the wrapped product is passed through a hot air or hot water shrink tunnel. This process causes the film to shrink around the product producing a tight, transparent wrapping that conforms to the contour of the product and which is aesthetically pleasing while providing the useful functions required of packaging materials such as protection of the product from loss of components, pilferage, damage due to handling and shipment, dirt and contamination. Typical items wrapped in PVC or polyolefin shrink films are toys, games, sporting goods, stationery, greeting cards, hardware and household products, office supplies and forms, foods, phonograph records, and industrial parts.

The manufacture of shrink films requires sophisticated equipment including extrusion lines with "orientation" capability, irradiation units when cross-linking is desired, tenter frames, mechanical center-folders, and slitters. "Racking" or "tenter framing" are orientation processes which cause the material to be stretched in the cross or transverse direction and in the longitudinal or machine direction. The films are usually heated to their orientation temperature range which varies with the different polymers but is usually above room temperature and below the polymer's melting temperature. After being stretched, the film is rapidly cooled to quench it thus freezing the molecules of the film in their oriented state. Upon heating, the orientation stresses are released and the film will begin t shrink back to its original unoriented dimension.

The PVC and polyolefin families of shrink films provide a wide range of physical and performance characteristics such as shrink force (the amount of force that a film exerts per unit area of its cross-section during shrinkage), the degree of free shrink (the reduction in surface area a material undergoes when unrestrained), tensile strength (the highest force that can be applied to a unit area of film before it begins to break), sealability, shrink temperature curve (the relationship of shrink to temperature), tear initiation and resistance (the force at which a film will begin to tear and continue to tear), optics (gloss, haze and transparency of material), and dimensional stability (the ability of the film to retain its original dimensions under all types of storage conditions). Film characteristics play an important role in the selection of a particular film and may differ for each type of packaging application and for each packager. Consideration must be given to the product's size, weight, shape, rigidity, number of product components, other packaging materials which may be used along with the film, and the type of packaging equipment available.

Polyolefins have been most successful with applications where moderate to high shrink tensions are preferred; and, on new, automatic, high speed shrink wrapping equipment where shrink and sealing temperature ranges are more closely controlled. The polyolefins tend to be cleaner, leaving fewer deposits and less residue thereby extending the life of the equipment and reducing equipment maintenance. The PVC films generally have better optics, lower shrink tensions, and will seal with greater strength at elevated temperatures and shrink over much broader temperature ranges than the polyolefins. Polyolefins usually do not emit corrosive gases upon sealing as do PVC films and, in this respect, are also cleaner than PVC films.

Heretofore, polyolefins have not been able to penetrate PVC film packaging applications where the products to be packaged require the lower shrink tensions of the PVC film because the products are too fragile for use with polyolefins which possess shrink tensions up to four times those of the PVC films. Such products include for example textiles, record jackets, and the like. PVC film is also the shrink film of choice for older, manually operated sealers and semi-automatic wrappers where temperatures are highly variable. Older, poorly maintained wrapping equipment of any type usually runs PVC better than present monolayer polyolefins due to the combination of the generally broader shrink and sealing temperature ranges of the PVC films. In addition, products with sharp or pointed extensions will often require PVC due to the high initial tear resistance of the PVC film relative to that of the polyolefins, i.e. it takes about 7 grams of force to propagate a tear in PVC whereas only 2 to 3.5 grams of force are necessary to propagate a tear in a typical monolayer polyolefin shrink film.

Some success has been achieved by the use of certain multilayer polyolefin shrink films having three or five layer construction and including a core layer and/or outer layers of polyester or copolyester. Exemplary of such films is MPD 1055 manufactured by W. R. Grace & Co. While such shrink films have been successful for many applications, polyester and copolyester are expensive resins. It is therefore desirable to produce a more economical film for shrink applications where fragile products are to be packaged. It would also be advantageous to produce shrink films having improved heat seal strengths, and even lower shrink tensions than the presently available multilayer polyolefin shrink films. Additionally, it is desirable to obtain such a film which nevertheless maintains high free shrink properties at relatively low temperatures. This facilitates effective shrinking at temperatures typically used in commercial heat shrink equipment without the adverse effects on package and product which can result from too high a shrink temperature regime.

Accordingly, it is a general object of the present invention to provide a shrinkable polyolefin film that will have many of the desirable qualities of PVC films and will overcome many of PVC's limitations.

Specifically, it is an object of the present invention to provide a polyolefin film having a combination of improved (i.e. lower) shrink tensions approximating those of PVC films and also providing high free shrink, good optical qualities, a wide shrink temperature range, improved sealability, resistance to tear propagation, and hot seal strength greater than that of prior art multilayer polyolefin films.

In addition, it is an object of the present invention to provide a polyolefin film which has none of the undesirable qualities of PVC films such as noxious odors and corrosive by-products. These and other objects are achieved by the multilayer polyolefin shrink film which is disclosed herein.

SUMMARY OF THE INVENTION

It has been discovered that a flexible thermoplastic packaging film having improved (i.e. lower) shrink tension, is achieved by the multilayer, flexible, packaging film of the present invention. This multilayer film has three layers and the core layer comprises a polymeric material or blend of materials having a relatively low melting point. The multilayer film is stretch oriented so that it exhibits the properties of an oriented film and is heat shrinkable in at least one direction.

In one aspect of the present invention, a multilayer shrink film comprises a core layer comprising a polymeric material or blend of polymeric materials having a relatively low melting point; and two outer layers comprising a polymeric material or a blend of polymeric materials having a relatively high melting point; and wherein said film has an average machine direction shrink tension at 205° F. of no more than about 300 pounds per square inch, and an average transverse direction shrink tension at 205° F. of no more than about 300 pounds per square inch, said shrink tension values as measured by ASTM D2838 and wherein the material of the outer layers has a melting point of at least about 10° C. higher than the melting point of the material of the core layer.

In another aspect of the present invention, a method of making a multilayer shrink film comprises the steps of coextruding a core layer comprising a polymeric material or blend of polymeric materials having a relatively low melting point, and two outer layers comprising a polymeric material or blend of polymeric materials having a relatively high melting point, to form a coextruded tape; quenching the coextruded tape; optionally cross-linking the quenched tape; reheating the quenched and optionally cross-linked tape to a temperature above the orientation temperature range of the materials comprising the core layer, and within the orientation temperature range of the materials comprising the outer layers; and orienting the reheated tape.

DEFINITIONS

Unless specifically set forth and defined or limited, the terms "polymer" or "polymer resin" as used herein generally include homopolymers, copolymers, terpolymers, block, graft polymers, random, and alternating polymers.

The term "core" or "core layer" as used herein means a layer in a multilayer film which is enclosed on both sides by additional layers.

The term "outer" or "outer layer" as used herein means an outer layer of a multilayer film, usually a surface layer.

The term "linear low density polyethylene", sometimes abbreviated as LLDPE, as used herein refers to a copolymer of ethylene and an alpha-olefin such as butene, octene, hexene, or 4-methyl 1-pentene having a density of generally from about 0.910 to about 0.940 grams/cubic centimeter and in which the molecules comprise long chains with few or no branches or cross-linked structures.

The term "ethylene vinyl acetate copolymer" (EVA) as used herein refers to a copolymer formed from ethylene and vinyl acetate monomers wherein the ethylene derived units are present in major amounts and the vinyl acetate derived units are present in minor amounts, generally 1–30% by weight.

The term "ethylene propylene copolymer" (EPC) as used herein refers to a copolymer formed from ethylene and propylene monomers wherein the propylene derived units are present as a major constituent and the ethylene derived units are present as a minor constituent, generally from about 2 to 6% of by weight of the copolymer.

The term "very low density polyethylene", or "VLDPE" is used herein to describe a linear ethylene-alpha olefin copolymer having densities of generally between 0.890 and 0.915 grams/cubic centimeter, and produced by catalytic, low pressure processes.

The term "ethylene butyl acrylate", or "EBA", is used herein to refer to copolymers of ethylene and butyl acrylate having preferably between about 0.8% and 30%, more preferably about 18% butyl acrylate comonomer by weight.

The term "oriented" is used herein to refer to the alignment of the molecules of a polymer predominately in a particular direction. The term is used interchangeably with "heat shrinkability" and the like and designates material which has been stretched and set at its stretched dimensions. The material will have a tendency to return to its original dimensions when heated to a specific temperature below its melting temperature range.

The term "cross-linked" as used herein means that bonds have been formed between the molecules of a particular polymer. Cross-linking of some polymers can be induced by subjecting them to ionizing radiation such as gamma or X-rays or electrons or beta particles. For cross-linkable polymers such as polyethylene or ethylene vinyl acetate copolymer, the irradiation dosage level can be related to the degree of cross-linking by considering the insoluble gel, i.e. the portion of the polymer which will not dissolve in a solvent such as boiling toluene, to be the cross-linked portion of the irradiated polymer. Usually there is no measurable gel for radiation dosages of less than 0.5 megarads.

The term "relatively low melting point" as used herein refers to a melting point generally less than about 100° C. although in some cases melting points as high as 140° C. may be contemplated. A more important relationship between materials so described and relatively high melting point materials is that materials of the core layer are at least about 10° C., and more preferably at least about 20° C. lower in melting point than the polymeric materials or blends used in the outer layers. As an example, a material in the core layer of the present invention may have a melting point of 110° C., but be considered as having a "relatively low melting point" if the material of the outer layer has a melting point of 120° C. As another example, a core layer material having a melting point of about 90° C. is considered a material having a "relatively low melting point" if the material of the outer layer has a melting point of at least about 100° C.

The term "relatively high melting point" as used herein describes polymeric materials used in the outer layers with a melting point generally above 100° C., and more preferably above about 110° C. This phrase should be read in connection with the foregoing definition of "relatively low melting point" to understand the relationship between the materials of the core and outer layers respectively. Thus, in rare instances the term "relatively high melting point" may actually refer to polymeric materials or blends having a melting point slightly less than 100° C., but at least 10 degrees C higher than the melting point of the core layer material.

DISCLOSURE STATEMENT

Patents of interest are listed and discussed briefly in the paragraphs which follow.

U.S. Pat. No. 4,188,443 issued to Mueller discloses a multilayer polyolefin film including an interior layer of a polyethylene homopolymer or copolymer and one or more layers of polyester or copolyester, the film having shrink tensions in the range of 100 to 400 psi, and the polyethylene layer comprising between 10 and 85% of the total film in the five layer embodiment.

U.S. Pat. No. 4,194,039 issued to Mueller also discloses three and five layer embodiments including a layer of polyethylene homopolymer or copolymer and outside layers for example ethylene propylene copolymer, the film being biaxially oriented and heat shrinkable.

U.S. Pat. No. 3,595,735 issued to Tyrell disclose a blown film having a core layer of ethylene vinyl acetate copolymer, and outer layers of linear polyethylene.

U.S. Pat. No. 4,399,173 issued to Anthony et al discloses a multilayer packaging film comprising a core layer of low pressure low density polyethylene, and two outer layers of a high melt index low pressure low density polyethylene.

U.S. Pat. No. 4,399,180 issued to Briggs et al discloses a three-layer stretch wrap including a linear low density polyethylene core layer, and outer layers of highly branched low density polyethylene.

U.S. Pat. No. 4,352,849 issued to Mueller discloses a three layer film having a core layer including ethylene vinyl acetate copolymer, and outer layers of ethylene propylene copolymer.

U.S. Pat. No. 4,532,189 issued to Mueller discloses multiple layer polyolefin films including a core layer of linear low density polyethylene and outside layers containing ethylene propylene copolymer. In a five layer embodiment, intermediate layers of ethylene vinyl acetate copolymer may be included, and the film may be oriented at temperatures above the melting point of ethylene vinyl acetate copolymer.

U.S. Pat. No. 4,551,380 issued to Schoenberg discloses a multiple layer polyolefin film including a core layer of linear low density polyethylene and outer blend layers including ethylene vinyl acetate copolymer, the film being cross-linked and suitable for packaging.

U.S. Pat. No. 4,590,124 issued to Schoenberg discloses a film similar to that disclosed in the 380 patent discussed above.

U.S. Pat. No. 4,514,465 issued to Schoenberg discloses a five ply film having intermediate layers of linear low density polyethylene and outer layers including ethylene vinyl acetate copolymer in a blend. The film is a shrinkable film.

European Patent Application Publication No. 0229715 (Thies) discloses a multilayered polyolefin high shrinkage low shrink force film having one or two outer layers of a polyolefin and a core layer of material having a melting point below the temperature required to orient the material of the outer layers. The core layer comprises 50% to 95% of the overall thickness of the film. Three layer films including outer layers of linear low density polyethylene and core layers of ionomer are disclosed. Ethylene vinyl acetate copolymer having a vinyl acetate percent of at least about 12% is disclosed as intermediate tie layers in five layer embodiments.

DESCRIPTION OF THE PREFERRED EMBODIMENTS

Figure 1:
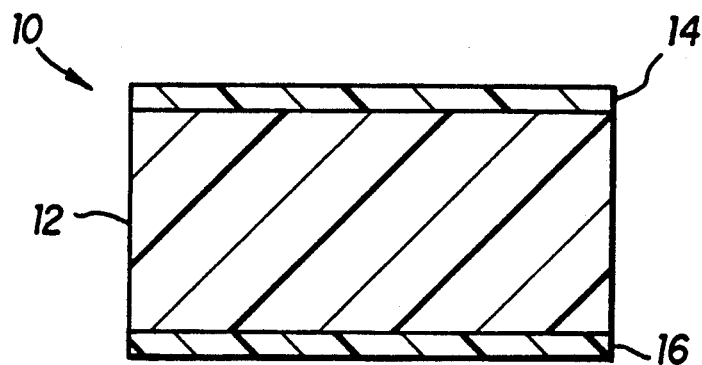
FIG. 1 is a cross sectional view of a preferred three layer embodiment of the present invention.

Referring to FIG. 1, which is a cross sectional view of a three layered preferred embodiment of the present invention, it is seen that this embodiment comprises core layer 12, and outer layers 14 and 16 are disposed on either side of the core layer. A preferred thickness ratio of the three layers is suggested by the drawing. Preferably, the outer layers are relatively thin, and core layer 12 comprises about 40% to 95% of the total thickness of the multilayer film.

Core layer 12 preferably comprises an ethylene vinyl acetate copolymer (EVA). Suitable commercial resins are PE-3432 available from Du Pont, and having a vinyl acetate content of about 20% by weight of the copolymer, and ELVAX 3135 also available from Du Pont and having a vinyl acetate content of about 12% by weight of the copolymer.

The core layer may also comprise very low density polyethylene (VLDPE). The VLDPE contributes processability and toughness to the overall film. It also increases the shrink tension of the film, other factors being equal, so that it is preferred that the VLDPE be blended with for example EVA. Preferably, the VLDPE comprises a maximum of about 50% of the blend material. A more preferred blend ratio includes about 80% EVA and about 20% VLDPE.

Ethylene butyl acrylate copolymer (EBA) may also be used in the core layer. These copolymers, having normal butyl acrylate comonomer, are available from Quantum under the designation NPE 4774.

Also suitable for use in the core layer is ethylene methyl acrylate copolymer.

An especially preferred material for core layer 12 is a blend of EVA, EBA and mineral oil. Preferably, the EVA constitutes a major portion of the blend, more preferably about 75% of the blend by weight. The EBA preferably constitutes a minor portion of the blend, more preferably about 25% by weight. The mineral oil plasticizer, if present, constitutes a very small portion of the blend, preferably less than about 10% and more preferable about 0.5% of the total blend by weight.

Other combinations of the above components may be combined as blends suitable for core layer 12.

All of the materials and material blends of the core layer are characterized by their function as a shrink energy-controlling layer. Both the shrink tension and free shrink properties of the film, so important in the packaging of shrink-sensitive products, are largely determined by layer 12. It is therefore desirable for this layer to form at least about 40%, and more preferably at least about 70%, of the total film structure by weight.

Outer layers 14 and 16 may comprise a linear low density polyethylene, or blend of two of these resins, or may comprise an ethylene propylene copolymer. A suitable LLDPE resin may be of the series of LLDPE resins produced by Dow Chemical Company. Several other manufacturers offer LLDPE resins. For example, Union Carbide and Exxon both produce LLDPE resins of 0.910 to 0.935 grams per cubic centimeter range, as do other suppliers. Resins with still higher densities are also available. Combinations of these resins may be used as a blend for outer layers 16 and 18.

A suitable EPC for outer layers 16 and 18 is Z7950 available from Cosden Chemical Company.

Polymeric materials such as polyester, low density polyethylene, high density polyethylene and polypropylene are also suitable as materials for outer layers 14 and 16. These materials are commercial resins available from a number of manufacturers and suppliers.

Although it is preferred that outer layers 14 and 16 be identical, and comprise the same polymeric material, different materials may be used for layers 14 and 16.

Small amounts of processing aids or other additives may be added for example by a master batch process, wherein the master batch comprises Small amounts of processing aids or other additives may be added for example by a master batch process, wherein the master batch comprises between about 1% and 100% by weight of the outer layer.

In the preferred process for making the multilayer shrink film of the present invention basic steps are blending the polymers for the various layers, coextruding the layers to form a multilayer film, and then stretching the film to biaxially orient. These steps and additional optional steps will be explained in detail in the paragraphs which follow.

The process begins by blending the raw materials (i.e. polymeric resin) in the proportions and ranges desired as discussed earlier. The resins are usually purchased from a supplier in pellet form and can be blended in any one of a number of commercially available blenders as is well known in the art, in the event that a blend is to be used in the outer layers. During the blending process any additives and/or agents which are desired to be utilized are also incorporated.

Blending of processing aids and other additives into a master batch is also preferably accomplished prior to coextrusion to insure uniform distribution of the additives throughout the resin.

The blend resins and applicable additives and/or agents are then fed into the hoppers of extruders which feed the coextrusion die. The materials are coextruded as a tube having a diameter which depends on the stretching ratio and desired final diameter. This coextruded tube is relatively thick and is referred to as the tape. Circular coextrusion dies are well known in the art and can be purchased from a number of manufacturers. In addition to tubular coextrusion, slot dies could be used to coextrude material in planar form. Well known single or multilayer extrusion coating processes could also be employed if desired.

An optional processing step which may be utilized is the irradiation of the tape by bombarding for example high energy electrons from an accelerator to cross-link the materials of the tape. Cross-linking greatly increases the structural strength of the film or the force at which the material can be stretched before tearing apart when the film materials are predominately ethylene such as polyethylene or ethylene vinyl acetate. Thus, when using outer layers of LLDPE, cross-linking is particularly advantageous in processing the tape into a shrinkable film. The irradiation also improves the optical properties of the film and changes the properties of the film at higher temperatures. Preferred radiation dosages for the present multilayer film are in the range of about 1 megarad (MR) or less to about 4 megarads.

Following coextrusion, quenching, and optionally irradiation, the extruded tape is reheated and continuously inflated by internal air pressure into a bubble (blown bubble technique) thereby transforming the narrow tape with thick walls into a wider film with thin walls of the desired film thickness. After stretching, the bubble is then deflated and the film wound onto semi-finished rolls called mill rolls. During the orienting step, film is oriented by stretching it transversely and longitudinally to rearrange the molecules and impart shrink capabilities such as shrink tension and free shrink to the film.

A key feature of the present invention is that the materials used for core layer 12 have a melting point of less than about 100° C., and the materials used for outer layers 14 and 16 have a melting point above about 100° C. In addition, the melting point of the core layer material is at least about 10° C. lower than the melting point of the outer layers. More preferably, the difference in melting points between the core materials and the outer materials is about 20° C. The difference in melting points may be as much as 40° C. or greater.

In orienting the quenched and irradiated tape, the tape may be heated to a temperature above the orientation temperature of the core layer but below the melting point and within the orientation temperature of the outer layer materials. It is more preferable that the tape is heated above the melting point as well as the orientation temperature of the core layer materials (e.g. EVA) and within the orientation temperature of the outer layer materials. It is even more preferable that the tape be heated to just below the melting temperature of the resins of the outer layers. At this point the heated tape is quickly stretched both longitudinally and transversely and quickly cooled to below its melting temperature before the residual stresses have the opportunity to relax.

To further disclose and clarify the scope of this invention to those skilled in the art the following examples are presented by way of illustration only.

EXAMPLE 1

A 1/3/1 layer ratio 25 mil tape was produced using a 5 melt index (condition 1), 3.5% ethylene propylene copolymer outer layers and a core layer consisting of an EVA (Elvax 3508) with a vinyl acetate content of about 12% by weight and a melt index of 0.45 (condition E) with 19% of an ethylene acrylic acid copolymer and 6% of a liquid compound acting as a plasticizer. The plasticizer was introduced by compounding the quaternary amine (Larostat) in the ethylene acrylic acid copolymer (Primacor 1410) as a masterbatch, and then mixing the masterbatch into the EVA in a conventional manner. The masterbatch formed 25% by weight of the core layer. The masterbatch itself constituted about 76% by weight of the ethylene acrylic acid copolymer, and about 24% by weight of the quaternary amine. The tape was oriented at 121° C. and the resulting 100 gauge film had a maximum shrink tension of approximately 250 psi with approximately 40% free shrink at 110° C.

EXAMPLE 2

A film was made substantially as described in respect to the film of Example 1, but with a 1/6/1 layer ratio. The resulting film had a shrink tension of 210 psi and 110° C.

EXAMPLE 3

An EVA (Elvax 3508) with a 12% vinyl acetate content and a melt index of 0.45 was blended with 25% (by weight of the total blend) of an ethylene butyl acrylate copolymer having 18% butyl acrylate comonomer by weight and a melt index of 0.4 grams/10 min (Condition E). 0.5% of a mineral oil plasticizer was also added to the blend. A 1/13/1 layer ratio 15 mil tape consisting of the EVA/EBA blend as a core layer, and a three melt index, 0.92 grams/cc density LLDPE blend as two outer layers disposed on either side of the core layer was produced. The LLDPE blend consisted of 50% of an LLDPE having a melt index of about 6.0, and 50% of an LLDPE having a melt index of about 1.0. Following irradiation at an equivalent dosage level of 1 MR, the film was oriented at 105° C. This resulted in a 60 gauge film having a maximum average shrink tension of 200 psi at 90° C. with 40% free shrink.

It should be understood that the detailed description and the specific examples which indicate the presently preferred embodiments of the invention are given by way of illustration since various changes and modifications within the spirit and scope of the invention will become apparent to those of ordinary skill in the art upon review of the above detailed description and examples.

In view of the above, we claim:

1. A multilayer shrink film comprising:
   (a) a core layer comprising a polymeric material or blend of polymeric materials having an olefin component and a relatively low melting point; and
   (b) two outer layers comprising a polymeric material or blend of polymeric materials comprising
      (i) an olefin component or
      (ii) a polyester, and
      having a relatively high melting point;
   wherein said film has a maximum average machine direction shrink tension of no more than about 300 pounds per square inch, and a maximum average transverse direction shrink tension of no more than about 300 pounds per square inch, said shrink tension values as measured by ASTM D 2838; and
   wherein the material of the outer layer has a melting point at least about 10° C. higher than the melting point of the material of the core layer.

2. A multilayer shrink film according to claim 1 wherein the two outer layers are each derived from a blend of two linear low density polyethylene resins.

3. A multilayer shrink film according to claim 1 wherein the core layer comprising a polymeric material selected from the group consisting of:
   (a) ethylene vinyl acetate copolymer;
   (b) very low density polyethyene;
   (c) ethylene butyl acrylate copolymer;
   (d) ethylene methyl acrylate copolymer; and
   (e) blends of these materials.

4. A multilayer shrink film according to claim 3 wherein the core layer comprises an ethylene vinyl acetate copolymer having between about 5% and about 20% by weight of vinyl acetate.

5. A multilayer shrink film according to claim 3 wherein the core layer comprises a blend of ethylene vinyl acetate copolymer, ethylene butyl acrylate copolymer, and mineral oil.

6. A multilayer shrink film according to claim 1 wherein the core layer comprises between about 40% and 95% of the total film structure.

7. A multilayer shrink film according to claim 1 wherein the outer layers each comprise a polymeric material selected from the group consisting of:
   (a) polyester;
   (b) linear low density polyethylene;
   (c) low density polyethylene;
   (d) high density polyethylene;
   (e) polypropylene; and
   (f) ethylene propylene copolymer.

8. A multilayer shrink film according to claim 1 wherein the film layers are cross-linked.

9. A multilayer shrink film according to claim 1 wherein the shrink tension of the film is substantially controlled by the core layer.

10. A multilayer shrink film comprising:
    (a) a core layer comprising a polymeric material or blend of polymeric materials having an olefin component and a relatively low melting point; and
    (b) two outer layers comprising a polymeric material or blend of polymeric materials comprising
       (i) an olefin component or
       (ii) a polyester, and
       having a relatively high melting point;
    wherein said film has a maximum average machine direction free shrink at 205° F. of at least about 20% and an average transverse direction free shrink at 205° F. of at least about 20%, said free shrink values as measured by ASTM D 2732; and
    wherein the material of the outer layer has a melting point at least about 10° C. higher than the melting point of the material of the core layer.

11. A multilayer shrink film according to claim 10 wherein the two outer layers each comprise a blend of two linear low density polyethylene resins.

12. A multilayer shrink film according to claim 10 wherein the core layer comprises a polymeric material selected from the group consist of:
    (a) ethylene vinyl acetate copolymer;
    (b) very low density polyethylene;
    (c) ethylene butyl acrylate copolymer; and
    (d) ethylene methyl acrylate copolymer; and
    (e) blends of these materials.

13. A multilayer shrink film according to claim 12 wherein the core layer comprises an ethylene vinyl acetate copolymer having between about 5% and about 20% by weight of vinyl acetate.

14. A multilayer shrink film according to claim 12 wherein the core layer comprises a blend of ethylene vinyl acetate copolymer, ethylene butyl acrylate copolymer, and mineral oil.

15. A multilayer shrink film according to claim 12 wherein the core layer comprises between about 40% and 95% of the total film structure.

16. A multilayer shrink film according to claim 12 wherein the outer layers each comprise a polymeric material selected from the group consisting of:
    (a) polyester;

(b) linear low density polyethylene;
(c) low density polyethylene;
(d) high density polyethylene;
(e) polypropylene; and
(f) ethylene propylene copolymer.

17. A multilayer shrink film according to claim 12 wherein the film layers are cross-linked.

18. A multilayer shrink film according to claim 12 wherein the free shrink of the film is substantially controlled by the core layer.

* * * * *